(12) United States Patent
Willman et al.

(10) Patent No.: US 7,269,702 B2
(45) Date of Patent: Sep. 11, 2007

(54) TRUSTED DATA STORE FOR USE IN CONNECTION WITH TRUSTED COMPUTER OPERATING SYSTEM

(75) Inventors: Bryan Mark Willman, Kirkland, WA (US); Paul England, Bellevue, WA (US); Keith Kaplan, Bothell, WA (US); Alan Stuart Geller, Redmond, WA (US); Brian A. LaMacchia, Seattle, WA (US); Blair Brewster Dillaway, Clyde Hill, WA (US); Marcus Peinado, Bellevue, WA (US); Michael Alfred Aday, Bellevue, WA (US); Selena Wilson, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 308 days.

(21) Appl. No.: 10/456,124

(22) Filed: Jun. 6, 2003

(65) Prior Publication Data
US 2004/0250036 A1 Dec. 9, 2004

(51) Int. Cl.
*G06F 12/14* (2006.01)
(52) U.S. Cl. .......... 711/163; 711/200; 711/203
(58) Field of Classification Search ........... 711/163, 711/203, 200; 713/200
See application file for complete search history.

(56) References Cited

U.S. PATENT DOCUMENTS 5,892,900 A  4/1999 Ginter et al.
2001/0020254 A1* 9/2001 Blumenau et al. ......... 709/229
2002/0103964 A1* 8/2002 Igari ......................... 711/112
2003/0145182 A1* 7/2003 Naito et al. ................ 711/163
2004/0068631 A1* 4/2004 Ukeda et al. .............. 711/163
2004/0117576 A1* 6/2004 Kobayashi et al. ........ 711/163

OTHER PUBLICATIONS

Bugnion, E. et al., "Disco: Running Commodity Operating Systems on Scalable Multiprocessors", *Proceedings of the 16th Symposium on Operating Systems Principles (SOSP)*, 1997, 1-14.
Coffing, C.L. "An x86 Protected Mode Virtual Machine Monitor for the MIT Exokernel", *Submitted to the Department of Electrical Engineering and Computer Science*, May 21, 1999, 1-109.
Goldberg, R.P. "Survey of Virtual Machine Research", *IEEE Computer*, Jun. 1974, 34-45.
Popek, G.J. et al., "Formal Requirements for Virtualizable Third Generation Archictectures", *Communications of the ACM*, Jul. 1974, 17(7), 412-421.
Smith, J.E. "An Overview of Virtual Machine Architectures", Oct. 26, 2001, 1-20.
Waldspurger, C.A. "Memory Resource Management in VMware ESX Server", *Proceedings of the 5th Symposium on Operating Systems Design and Implementation*", Dec. 9-11, 2002, 15 pages.

* cited by examiner

Primary Examiner—Pierre Bataille
Assistant Examiner—Sheng-Jen Tsai
(74) Attorney, Agent, or Firm—Woodcock Washburn LLP

(57) ABSTRACT

A trusted data store is provided for use with a trusted element of a trusted operating system on a computing machine. In the trusted data store, a storage medium stores data in a pre-determined arrangement, where the data includes trusted data from the trusted element of the trusted operating system on the computing machine. An access controller writes data to and reads data from the storage medium, and a trust controller is interposed between the computing machine and the access controller. The trust controller allows only the trusted element to perform operations on the trusted data thereof on the storage medium.

8 Claims, 7 Drawing Sheets

TRUSTED DATA STORE FOR USE IN CONNECTION WITH TRUSTED COMPUTER OPERATING SYSTEM

TECHNICAL FIELD

The present invention relates to a computer operating system that can be trusted to act in a particular manner without interference from a hardware or software entity such as a computer virus, a nefarious trespasser, or the like. More particularly, the present invention relates to a data store that is trusted to store data from such trusted computer operating system and to only honor commands with respect to such trusted data that originate from such trusted computer operating system.

BACKGROUND OF THE INVENTION

In at least some circumstances it is desirable to have in a computing machine both a main operating system that controls most processes and devices on the machine, and also a limited-purpose operating system along with the main operating system to perform certain limited tasks, perhaps on behalf of the main operating system. For example, it may be desirable to have as the limited-purpose operating system a trusted operating system that can be trusted to perform certain functions, perhaps on behalf of the main operating system and perhaps with the aid of certain functionality provided by the main operating system.

Such a trusted operating system may be a high-assurance operating system or 'nexus' that is intended to provide a high level of assurance as to the behavior thereof. For example, a nexus might be employed to work with confidential or secret information such as cryptographic keys or other sensitive data that should not be disclosed or divulged externally.

As may be appreciated, such a nexus operates in general by employing restricted memory that cannot be viewed externally from the nexus, and may permit only certain applications to execute under the nexus and to access the restricted memory. Fundamentally, the nexus is expected to behave properly and to provide the aforementioned high level of assurance, as opposed to the main operating system, which has no such expectation. Thus, the nexus should not interact with the main operating system in any way that would allow events happening at the main operating system to compromise the behavior of the nexus. In particular, no entity such as a computer virus, a nefarious trespasser, or the like should be able to interfere with the nexus by way of the main operating system.

Assuming the nexus does in fact behave properly and does in fact provide the aforementioned high level of assurance, it is to be appreciated that the nexus can at times be expected to store certain data generated or employed thereby in a data store external to such nexus, where the data store can be expected to be accessible to elements other than the nexus. For example, if the computing machine is a personal computer, the nexus can at times be expected to store certain nexus data in a hard drive, a memory card, or some other memory device for later retrieval. As may be appreciated, the data store is organized according to a file system which typically may be accessed by most any entity, interfering or otherwise. Accordingly, and also typically, such stored nexus data is in an encrypted form and therefore is not subject to being exposed to an interfering entity merely by being stored in the data store.

Nevertheless, an interfering hardware or software entity may still wreak havoc upon the encrypted stored nexus data in the data store merely by deleting or over-writing such data from such store, or in the case of a log file or the like to which data is periodically appended, by deleting or over-writing at least some of the appended data. Accordingly, a need exists for a method and mechanism for preventing an interfering entity from attacking stored nexus data in a data store by deleting or overwriting such data. More generally, a need exists for a method and mechanism for preventing the data store from honoring any command from an interfering entity with respect to stored nexus data therein. Even more generally, a need exists for a method and mechanism for preventing the data store from honoring any command from any entity other than the nexus with respect to stored nexus data therein.

SUMMARY OF THE INVENTION

The aforementioned need is satisfied by the present invention in which a trusted data store is provided for use with a trusted element of a trusted operating system on a computing machine. In the trusted data store, a storage medium stores data in a pre-determined arrangement, where the data includes trusted data from the trusted element of the trusted operating system on the computing machine. An access controller writes data to and reads data from the storage medium, and a trust controller is interposed between the computing machine and the access controller. The trust controller allows only the trusted element to perform operations on the trusted data thereof on the storage medium.

The trust controller receives a command with respect to the trusted data of the trusted element from the computing machine and forwards the command to the access controller only if the command is from the trusted element. Correspondingly, the trust controller prevents any other entity from performing such operations on such trusted data on the storage medium.

To respond to a data request, the trust controller receives the data request from an element, either trusted or un-trusted, and determines whether the received data request is with regard to a logical unit of the storage medium that has been seized by a trusted element. If not, the trust controller honors the request by passing same to the access controller for further request processing. If so, the trust controller determines whether the received data request includes an authentication.

If no authentication is included, the trust controller refuses the request. If an authentication is included, the trust controller determines whether the authentication verifies. If the authentication verifies, the trust controller concludes that the data request originates from a trusted element that owns the logical unit of such data request and honors the request by passing same to the access controller for further request processing. If the authentication does not verify, the trust controller concludes that the data request originates from a source other than the trusted element that owns the logical unit of such data request and refuses the request.

To respond to a data request that requires the trust controller to seize a logical unit of a storage medium of the trusted data store, the trust controller receives the data request from an element, either trusted or un-trusted, and determines whether the received data request is with regard to a logical unit of the storage medium that is to be seized by a trusted element. If not, the trust controller honors the request by passing same to the access controller for further request processing. If so, the trust controller determines whether the received data request includes an authentication.

If no authentication is included, the trust controller refuses the request. If an authentication is included, the trust controller determines whether the authentication verifies. If the authentication verifies, the trust controller concludes that the data request originates from a trusted element, seizes the logical unit for the requesting trusted element by placing an identifier of the trusted element in a corresponding entry of an ownership list, and honors the request by passing same to the access controller for further request processing. If the authentication does not verify, the trust controller concludes that the data request originates from a source other than the trusted element and refuses the request.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Overview

The present invention is directed to a method and mechanism by which stored nexus data in a data store external to a nexus is protected by the data store. In particular, in the invention, the data store can be expected to be accessible by elements other than the nexus, and includes a controller that examines all commands with regard to data in the store and that honors commands with regard to nexus data only if the command originates from the nexus that owns such data.

Computer Environment

Figure 1:
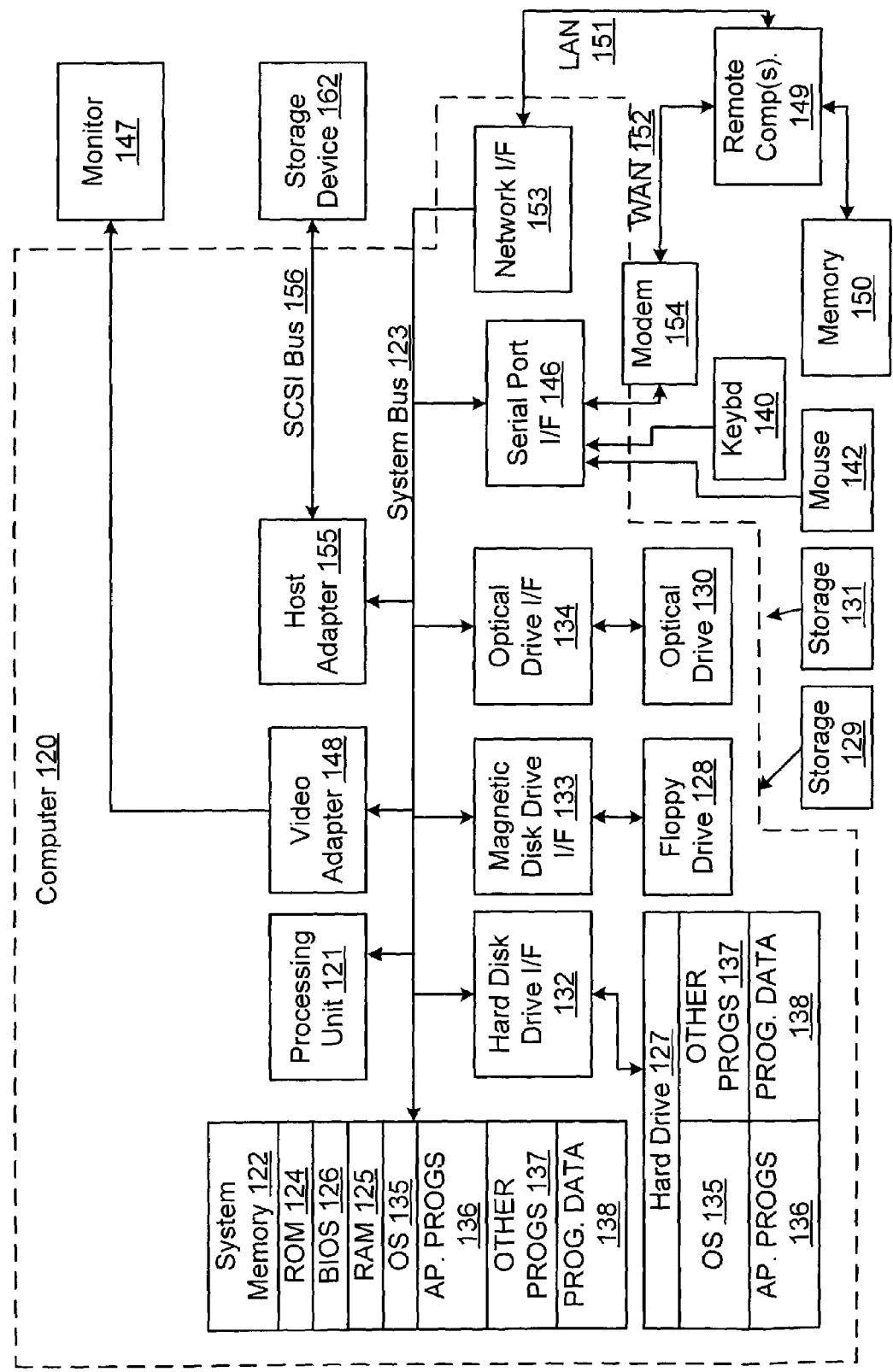
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Un-Trusted Operating System and Trusted Operating System

Figure 2:
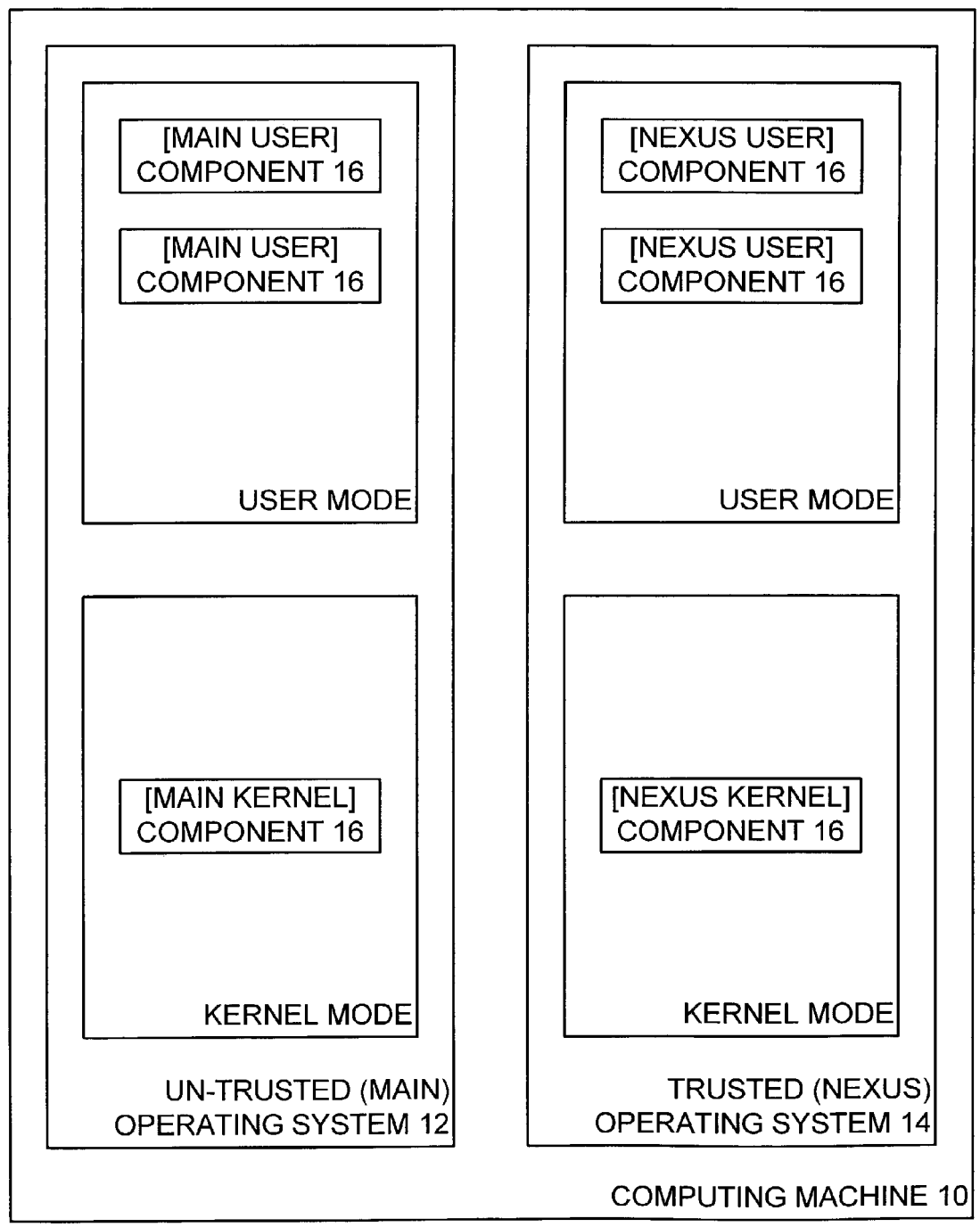
FIG. 2 is a block diagram showing the structure of a computing machine with both a trusted computer operating system and an un-trusted computer operating system instantiated thereon.

Turning now to FIG. 2, it is seen that one environment in which the present invention is especially useful is where a computing machine 10 has both a main, un-trusted operating system 12 and a limited-purpose, trusted operating system (i.e., a nexus) 14. As may be appreciated, in such a machine 10, operations that are of a sensitive nature and that require a heightened level of trust, such as cryptography, software and/or user identity verification, license examination, authorization determination, and the like, are performed in the nexus 14, and operations that are not of such a sensitive nature and that do not require a heightened level of trust are performed in the main operating system 12. As should be understood, however, the present invention may also be used in connection with any other computing machine 10 having any other operating system or operating systems thereon without departing from the spirit and scope of the present invention.

Generally, the trusted nexus 14 may impose limitations on which software and non-software processes and components (hereinafter "components 16") are permitted to execute thereon. For example, the nexus 14 may require that only components 16 that have been established as trustworthy be permitted to execute therein, and may authenticate each such certified component 16 before permitting execution of same. As may be appreciated, the nexus 14 may alternatively have less restrictive requirements. It may for example be the case that the computing machine 10 has a set of instructions that can only be executed by the nexus 14. Typically, components 16 executing in the nexus 14 have access to special trusted resources such as memory, registers, addresses, and the like.

A component 16 may be established as trustworthy with respect to the nexus 14 in any particular manner without departing from the spirit and scope of the present invention. For example, a trustworthy component 16 may carry a certificate indicating that a trusted verifier has determined that the component 16 behaves according to some standard. Thus, the nexus 14 cryptographically verifies the certificate and establishes a relationship between the certificate and the component 16 to establish trust with regard to such component 16.

In contrast, un-trusted main operating system 12 is typically a relatively open environment in which most any component 16 is permitted to execute thereon. Typically, components 16 executing in the main operating system 12 do not have access to the aforementioned special trusted resources available only within the nexus 14. In the case where the un-trusted main operating system 12 and the trusted nexus 14 operate side-by-side on the computing machine 10, as is shown, the nexus 14 may take steps to ensure that the trustworthiness thereof cannot be affected by any component 16 executing on the main operating system 12.

As shown, the main operating system 12 and the nexus 14 on the computing machine 10 may be divided into sub-environments. For example, each operating system 12, 14 may be divided into a user mode where non-operating system component 16 typically execute and a kernel mode where operating system components 16 typically execute. In the case of the nexus 14, it may be the case that only a single kernel component 16 executes in the kernel mode, while multiple user components 16 execute in the user mode. Each user component 16 executing in the nexus 14 performs a trusted function, and if storing data in connection with such function may encrypt such data according to a unique cryptographic key. Thus, encrypted data from one user component 16 of the nexus 14 is not normally accessible to another user component 16 of the nexus 14 absent some arrangement therebetween.

Note that a computing machine 10 may have several non-trusted operating systems 12 operating thereon at any one time, and also may have several trusted operating systems 14 operating thereon at any one time, too. However, it may be wise to limit the computing machine 10 to having a single trusted operating system 14 operating thereon at any one time. If so, the computing machine 10 may instantiate multiple trusted operating systems 14 thereon in a non-overlapping serial manner, as need be.

Aspects of a computing machine 10 with both non-trusted and trusted operating systems 12, 14 are explored in greater detail in U.S. patent applications Ser. No. 10/319,148, filed Dec. 13, 2002 and entitled "Memory Isolation Through Address Translation Data Edit Control"; and in U.S. patent applications Ser. No. 10/428,279, filed May 2, 2003 and entitled "Techniques to Support Hosting of a First Execution Environment by a Second Execution Environment With Protection for the First Execution Environment", each of which is hereby incorporated by reference in its entirety.

Trusted Data Store

Figure 3:
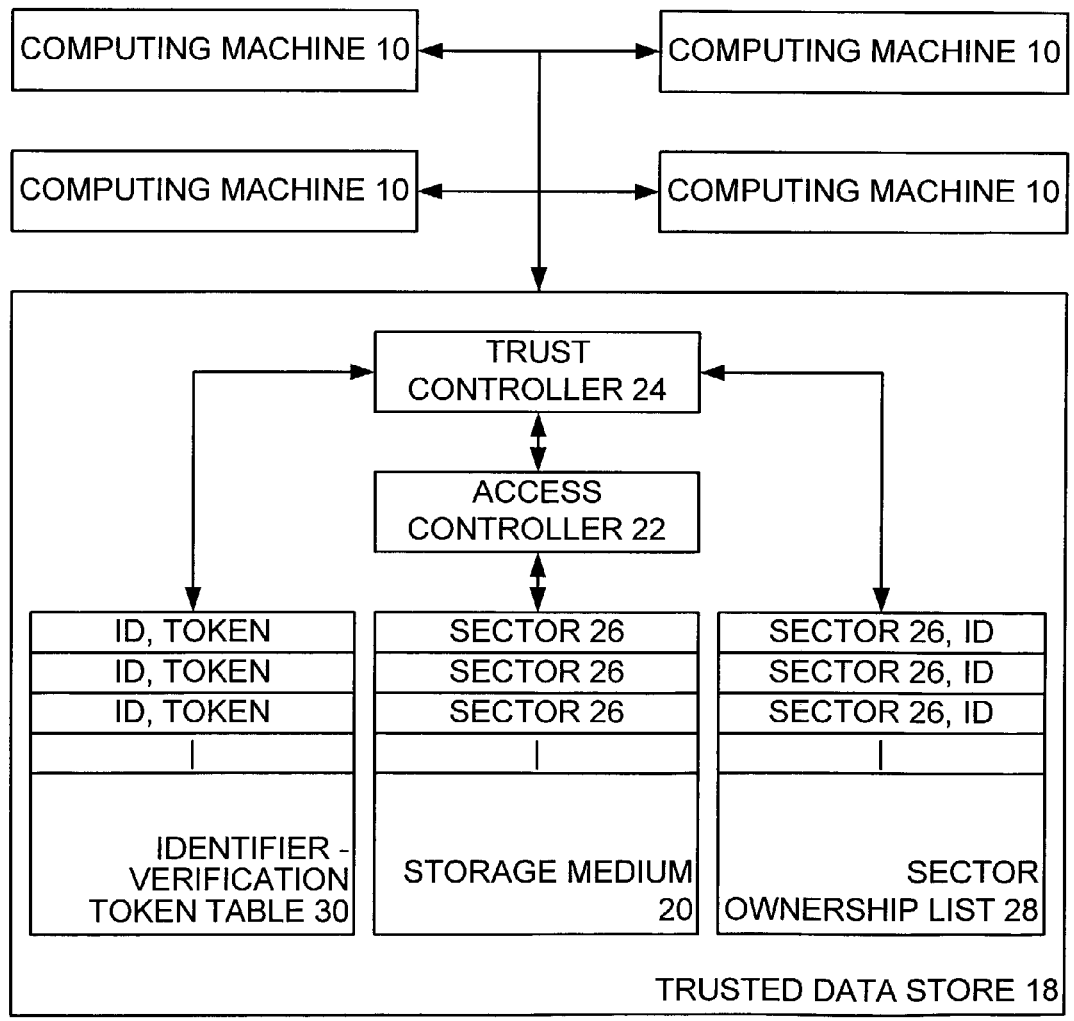
FIG. 3 is a block diagram of a trusted data store for use in connection with the computing machine of FIG. 2 in accordance with one embodiment of the present invention.

Turning now to FIG. 3, it is seen that the computing machine 10 of FIG. 2 may include therewith or be coupled to a data store 18 so that the operating systems 12, 14 may either store data in the data store 18 or may retrieve data from such data store 18 as need be. The data store 18 may be local to or remote from the computing machine 10 without departing from the spirit and scope of the present invention. For example, the data store 18 can be a local or remote hard drive, a local or remote server, a local or remote memory card, a local or remote RAM, or some other local or remote memory device where data can be stored and retrieved. Note that the data store 18 may be volatile or non-volatile in nature, and can in fact be removable media.

Note, too that the computing machine 10 with which the data store 18 is associated may be a personal computer of any kind or variety, a server computer, a portable device such as a content playback device, or any other type of computing machine 10 without departing from the spirit and scope of the present invention. For example, the computing machine 10 may even be a cellular or portable telephone, a landline telephone, a personal digital assistant (PDA), a digital radio, a digital transceiver, etc.

The data store 18 may be accessed by the computing machine 10 in any appropriate manner without departing from the spirit and scope of the present invention. For example, the data store 18 may recognize one or more protocols including IDE, ATA, ATAPI, or the like. Typically, the data store 18 includes a storage medium 20 upon which the data is stored in some pre-determined arrangement, and an access controller 22 by which data is written to the storage medium 20 and by which data is read from the storage medium. As may be appreciated, the access controller operates at the direction of the computing machine 10, which communicates with such data store 18 based on a recognized protocol.

For example, for a hard disk drive data store 18 with a storage medium 20 comprising one or more platters, each platter may be organized into a number of circular tracks and each track may be organized into a number of arcual sectors. Thus, the access controller 22 receives commands for storing data on or retrieving data from the platters of the storage medium 20, where each command stipulates that the data is stored on or retrieved from a particular track and sector (hereinafter, sector).

Similarly, for a memory card-type data store 18 with a storage medium 20 comprising non-volatile RAM or the like, the RAM may be divided into sectors. Thus, the access controller 22 receives commands for storing data on or retrieving data from the sectors of the storage medium 20, where each command stipulates that the data is stored on or retrieved from a particular sector.

If remote from the computing machine 10, the data store 18 may be coupled thereto by way of an appropriate network (not shown). Especially in such situation, it may be the case that the data store 18 is coupled to multiple computing machines 10, where the operating systems 12, 14 of each one of the computing machines 10 may either store data in the data store 18 or may retrieve data from such data store 18 as need be.

At least as recognized by a computing machine 10, the data store 18 typically stores data organized according to a pre-defined file system, and accordingly each operating system 12, 14 includes at least one component 16 for performing file system accessing functions with the data store 18 according to the file system thereof. Alternatively, each nexus 14 may include a filing system component 16 that works in conjunction with a filing system component 16 in the main operating system 12 to perform file system accessing functions for the nexus 14.

As was alluded to above, in the prior art, any component 16 operating on any computing machine 10 coupled to the data store 18 could by way of an appropriate file system component 16 access most any piece of data stored in the data store 18, including stored nexus data associated with a nexus 14. Thus, an interfering entity in particular could for example create a virus or the like that instantiates an appropriate component 16 on a computing machine 10 to access the bits of the stored nexus data. However, such stored nexus data is typically in an encrypted form and therefore is not subject to being exposed to the interfering entity merely by being stored in the data store 18.

Nevertheless, the interfering entity can still wreak havoc upon the encrypted stored nexus data in the data store 18 merely by deleting or overwriting such data from such store 18 or modifying such data within the data store 18. Similarly, in the case of a log file or the like to which encrypted nexus data is periodically appended, the interfering entity can wreak havoc by deleting or overwriting at least some of the appended data. Likewise an interfering entity could perform a formatting operation on the data store to destroy the nexus data therein. Thus, in the prior art, the data store 18 was not trusted in that harm could still be done to the stored nexus data therein.

Accordingly, in one embodiment of the present invention, the data store 18 is made trusted by including therewith a trust controller 24 that prevents the interfering entity from attacking stored nexus data in a data store 18 by deleting or overwriting such data, that prevents the data store 18 from honoring any command from an interfering entity with respect to stored nexus data therein, and that prevents the data store 18 from honoring any command from any entity other than the nexus 14 with respect to nexus data thereof stored therein.

As may be appreciated, the trust controller 24 imparts trust functionality to the data store 18, as is set forth in more detail below. Such trust controller 24 may comprise hardware and/or software and/or some other form operating on the data store 18, and may be separate from or incorporated with the access controller 22 of the data store 18, all without departing from the spirit and scope of the present invention. Moreover, the trust controller 24 could be physically separate from the remainder of the data store 18, either locally or remotely, as long as the connection between the trust controller 24 and the remainder of the data store 18 is itself trusted. Such a trusted connection for example may be a physical cable in the local context, or a secure data connection in the remote context.

Further, regardless of whether a trust controller 24 is physically separate from or combined with a data store 18, the data store 18 may comprise one or more distinct memory items without departing from the spirit and scope of the present invention. For example, it may be the case that a single trust controller 24 is associated with or 'fronts' multiple hard disk drives, multiple memory cards, etc. Of course, in such a situation, the fronting trust controller 24 must be physically interposed between the storage mediums 20 and each computing machine 10.

Typically, in the data store 18, and as seen in FIG. 3, the storage medium 20 thereof is divided into a number of logical units such as sectors, blocks, or the like (hereinafter "sectors 26"), and the access controller 22 thereof receives and responds to commands on a sector level. That is, the access controller 22 may receive a 'read' request for the data in sector X of the storage medium 20 and respond thereto by obtaining such data from sector X and returning same to the requester. Similarly, the access controller 22 may receive a 'write' request to write data to sector Y of the storage medium 20 and respond thereto by in fact writing such data to sector Y. In a similar manner, the access controller 22 may receive a 'delete' request to delete all data in sector Z of the storage medium 20 and respond thereto by in fact deleting such data in sector Z.

In one embodiment of the present invention, then, to prevent an interfering entity from accessing nexus data or the like in the data store 18, the nexus 14 of each computing machine 10 or a sub-element thereof (hereinafter 'trusted element') may claim ownership of or 'seize' one or more sectors 26 of the storage medium 20 of such data store 18, and the trust controller 24 includes or has access to a sector ownership list 28 that specifies for each sector 26 of the storage medium 20 the owner thereof, if any. As may be appreciated, such list 28 is stored in a secure location such as on the storage medium 20 of the data store 18, or some ancillary storage location associated with the data store 18.

Note that the sector ownership list 28 may have any particular structure without departing from the spirit and scope of the present invention. For example, such list 28 may include each sector 26 of the storage medium 20 and the owner thereof, if any, perhaps in a table format. Alternatively, the list 28 may include ranges of sectors 26 and the owner of each range, if any, again perhaps in a table format.

In the case where there is only a single trusted element that accesses the data store 18, it may simply be enough to have in the sector ownership list 28 a single bit for each sector 26 or range of sectors 26 in the storage medium 20. In such a case, the trust controller 24 notes that the single trusted element has seized a particular sector 26 or range of sectors 26 by setting the corresponding bit in the list 28, perhaps to 1, and such trust controller 24 notes that the single trusted element has released a particular sector 26 or range of sectors 26 by resetting the corresponding bit in the list 28, perhaps to 0.

However, in the case where there are multiple trusted elements that access the data store 18, perhaps from multiple computing machines 10, it is not enough to merely note in the sector ownership list 28 by a single bit whether each sector 26 or range of sectors 26 in the storage medium 20 has been seized. Instead, in such a case, the trust controller 24 should note that one of the multiple trusted elements has seized a particular sector 26 or range of sectors 26 by setting in a corresponding entry in the list 28 an identifier assigned to the seizing trusted element, perhaps a non-zero number. As may now be appreciated, to note that a seizing trusted element has released a particular sector 26 or range of sectors 26, the trust controller may reset the corresponding entry in the list 28, perhaps to 0.

In one embodiment of the present invention, to gain access to a seized sector 26, the trusted element that owns such sector 26 must authenticate itself to the trust controller 24. Typically, such authentication may comprise sending to the trust controller 24 a credential or 'authentication' and proof that the credential belongs to the trusted element. One possible authentication could be a digital certificate from a trusted third party identifying a cryptographic key owned by the trusted element along with a proof of possession of that key generated by the trusted element. An alternative would be to send a signed license providing a trusted element identifier and an associated software digest value. Such associated value could be compared to a digest value computed over the element making the request to the trust controller 24. Other examples of authentication mechanisms that may be employed in connection with the present invention include: a name and password; and a unique identifier and a computed hash over a code image corresponding to the unique identifier.

As may be appreciated, with the authentication, the trusted element would send a command with regard to such sector 26 such as for example, 'read', 'write', 'delete', 'format', etc. Thus, the trust controller 24 authenticates the requesting trusted element with regard to the sector by verifying the authentication with the verification token and the proof of association with the trusted element.

As may be appreciated, to verify the received signature or otherwise authenticate the requesting trusted element, the trust controller 24 requires a verification token which is typically some sort of cryptographic verification key. In one embodiment of the present invention, then, prior to using a data store 18, a trusted element performs an initialization with such data store 18 to ensure that such data store 18 is trustworthy. Such an initialization is known or should be apparent to the relevant public and therefore need not be described herein in any detail. Generally, in the initialization, the data store 18 by way of the trust controller 24 thereof or another trust entity on the data store 18, proffers a digital certificate or the like from a source trusted by the trusted element, where the certificate attests that the data store 18 is trustworthy and is verifiable by the trusted element. In addition, there would be proof that the proffered digital certificate is associated with the trusted controller 24/data store 18, such as for example proof of possession of a particular private key.

In response, the trusted element delivers to the trust controller 24/data store 18 the verification token/verification key, perhaps encrypted in a manner decryptable by the trust controller 24/data store 18. Thereafter, the trust controller 24/data store 18 stores the verification token in an appropriate location, and the trusted element on the computing machine 10 and the data store 18 may begin to interact. As should be understood, then, it is equally important that the trusted element be able to determine trustworthiness with regard to the trusted controller 24 and the data store 18.

Note that in the case where there is only a single trusted element that accesses the data store 18, it may simply be enough to store the verification key for such single trusted element in a secure location in or associated with the data store 18. For example, such secure location may be the storage medium 20 of the data store 18, or some ancillary storage location associated with the data store 18. Thus, each request or command with regard to a sector 26 seized by the single trusted element is honored by the trust controller 24 only if the command is accompanied by the authentication from the single trusted element, and only if the authentication verifies based on the verification token received from such single trusted element. If the request/command with regard to the seized sector 26 is not accompanied by the authentication from the single trusted element, or if the signature fails to verify based on the verification token associated with such single trusted element, the trust controller 24 refuses to honor the request/command.

Note, too, that in the case where there are multiple trusted elements that access the data store 18, perhaps from multiple computing machines 10, the trust controller 24 must store the verification key for each of the multiple trusted elements in the secure location along with the identifier of such trusted element as is employed in the sector ownership list 28. In one embodiment of the present invention, then, the trust controller 24 includes or has access to an identifier-verification token table 30 that specifies for each identifier employed in the sector ownership list 28 the corresponding verification token that is to be employed to verify a request/command with regard to the trusted element corresponding to such identifier. As may be appreciated, such table 30 is stored in a secure location such as on the storage medium 20 of the data store 18, or some ancillary storage location associate with the data store 18.

As with only a single trusted element, each request or command with regard to a sector 26 seized by one of the multiple trusted elements is honored by the trust controller 24 only if the command is accompanied by the authentication from the requesting trusted element, and only if the signature verifies based on the verification token/key corresponding received from such requesting trusted element. Here, though, the trust controller 24 must ascertain from the request the sector 26, then must ascertain from the sector ownership list 28 based on the sector 26 the identifier of the owning trusted element, then must ascertain from the identifier-verification token table 30 based on the identifier the verification token to be employed to verify the request. If the request/command with regard to the seized sector 26 is not accompanied by the authentication from the requesting trusted element, or if the signature fails to verify based on the verification token/key associated with such requesting trusted element, the trust controller 24 refuses to honor the request/command.

Presumably all requests for data from the data store go through the trust controller 24, including requests from trusted elements and from un-trusted elements. Accordingly, if a request is for data from a non-seized sector 26, as noted in the sector ownership list 28, such request is honored without the need for authentication of such request. Of course, some division of requests for data from the data store may be employed without departing from the spirit and scope of the present invention.

As may be appreciated, a data request from an element, either trusted or un-trusted, to a trusted data store 18 may be sent directly by the sending element, or indirectly by the sending element by way of one or more intermediaries. As may also be appreciated, the data request is sent according to a communications protocol recognized by the trust controller 24 and trusted data store 18. As was set forth above, the data request may be to write data to a sector 26 of the data store 18, to read data from a sector 26 of the data store 18, to delete data from a sector 26 of the data store 18, or the like. Note that in general a data request may be classified as a request that requires the trust controller 24 to seize a sector 26 of the storage medium 20 of the trusted data store 18 on behalf of a trusted element, or as a request that requires the trust controller 24 to determine whether such a sector 26 has already been seized, such as a read operation, a re-write or overwrite operation, a delete operation, a format operation, etc., or as a combination of both.

Figure 4:
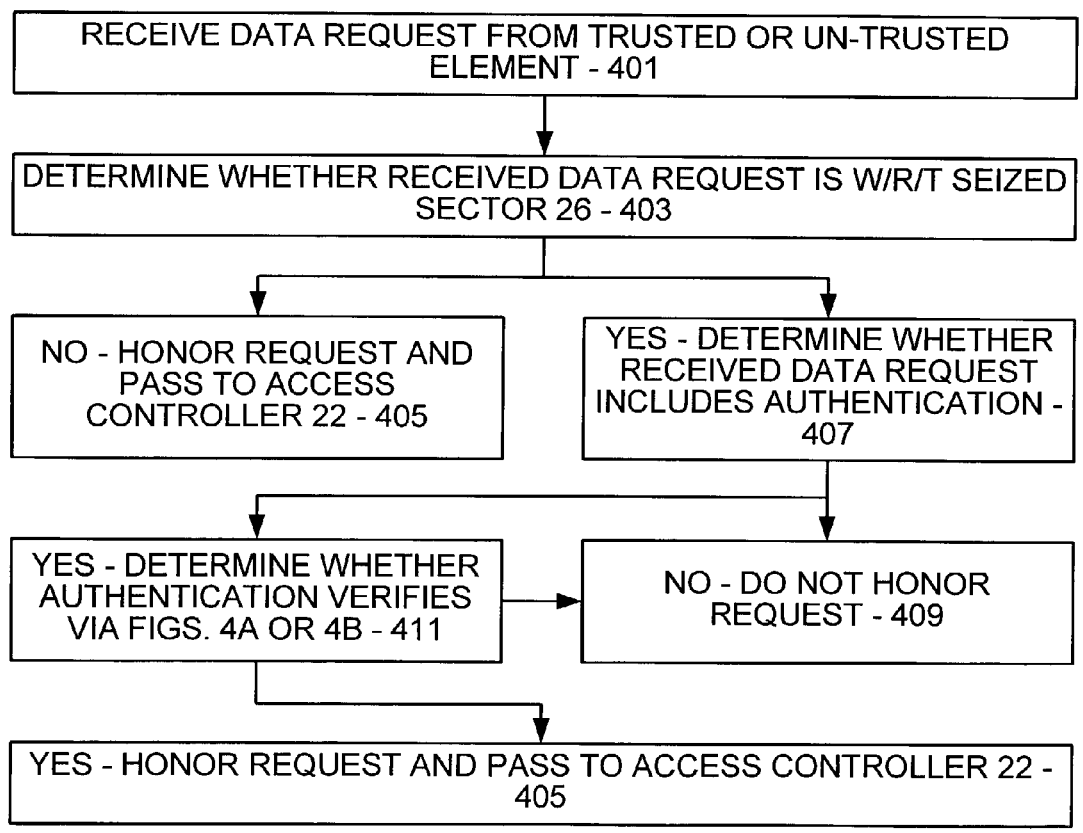
FIGS. 4, 4A, and 4B are flow diagrams showing steps performed in connection with the trusted data store of FIG. 3 in handling a data request in accordance with one embodiment of the present invention.

Turning now to FIG. 4, a method employed by the trust controller 24 to respond to a data request in connection with a trusted data store 18 is shown, where the request is with regard to a sector 26 and requires the trust controller 24 to determine whether such sector 26 has already been seized, and if so, by whom. Preliminarily, it is to be appreciated that the method is triggered when the trust controller 24 receives the data request from an element, either trusted or un-trusted (step 401).

After receiving the data request, the trust controller 24 determines whether the received data request is with regard to a sector 26 that has been seized by a trusted element such as the nexus 14 of a computing machine 10 or a sub-element thereof (step 403). Typically, the trust controller determines whether the sector 26 has been seized by referring to the sector ownership list 28 to see if the entry therein corresponding to the sector 26 has an identifier corresponding to a trusted element. If the received data request is not with regard to a sector 26 that has been seized by a trusted element, the trust controller 24 honors the request without further ado, and passes the request to the access controller 22 for further request processing (step 405).

However, if the received data request is indeed with regard to a sector 26 that has been seized by a trusted element, the trust controller 24 next determines whether the received data request includes an authentication (step 407). If the received data request does not include an authentication, the trust controller 24 does not honor the request (step 409), and the process ends. Of course, the trust controller 24 may return to the requesting element an appropriate message to the effect that the request is not honored.

Figure 4A:
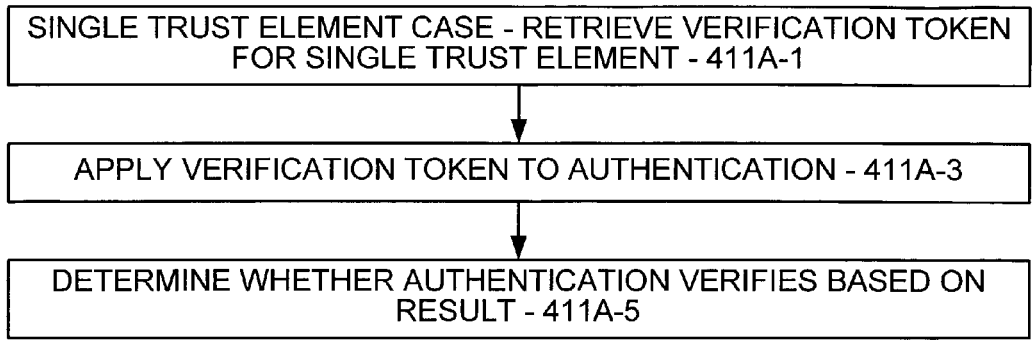

If the received data request does indeed include an authentication, the trust controller 24 next determines whether the authentication verifies (step 411). In particular, and turning now to FIG. 4A, if the trust controller 24 is only concerned with a single trusted element that accesses the data store 18, the trust controller 24 retrieves the verification token for such single trusted element (step 411*a*-1), and applies the verification token to the authentication (step 411*a*-3). As may be appreciated, the trust controller 24 determines whether the authentication verifies based on the result of the application (step 411*a*-5).

Figure 4B:
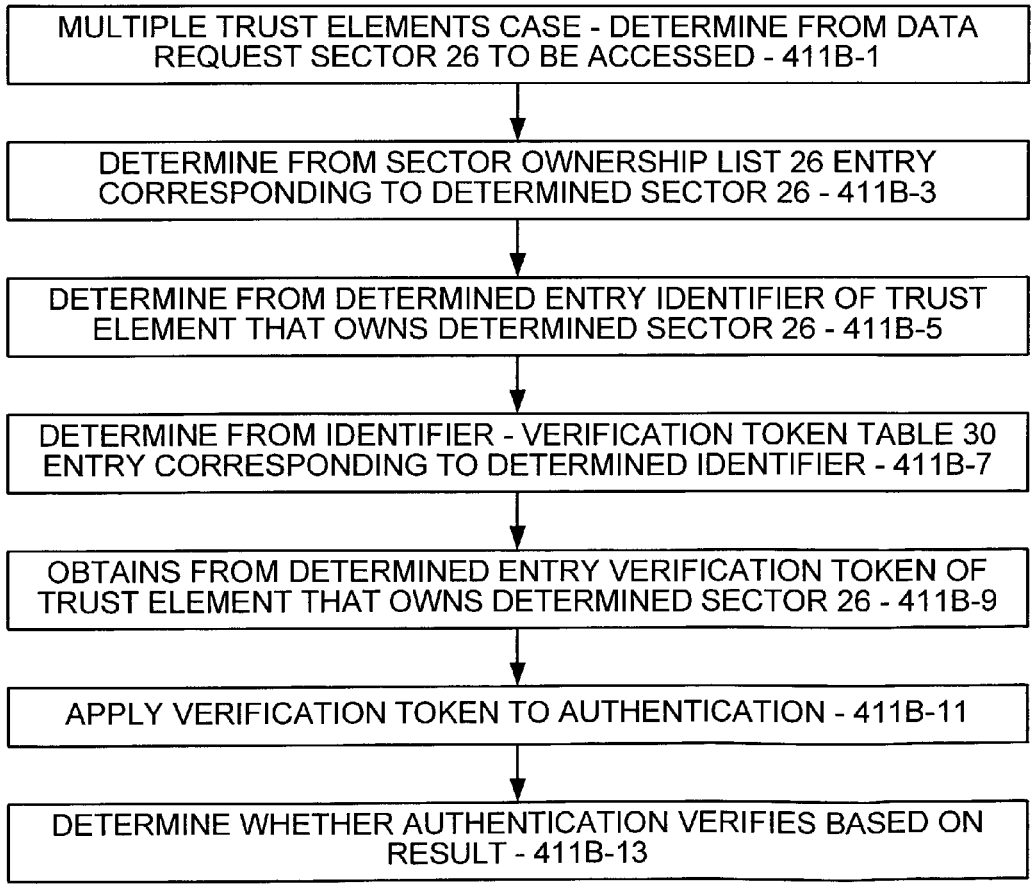

Turning now to FIG. 4B, if the trust controller 24 is concerned with multiple trusted elements that access the data store 18, the trust controller first determines from the data request the sector 26 that is to be accessed (step 411*b*-1), then determines from the sector ownership list 26 the entry corresponding to the determined sector 26 (step 411*b*-3), and then determines from the determined entry the identifier of the trusted element that owns the determined sector 26 (step 411*b*-5). Thereafter, the trust controller determines from the identifier- verification token table 30 the entry corresponding to the determined identifier (step 411*b*-7), and then obtains from the determined entry the verification token of the trusted element that owns the determined sector 26 (step 411*b*-9). Once the verification token of the owning trusted element is obtained, and similar to the process shown in FIG. 4A, the trust controller 24 in FIG. 4B applies the verification token to the authentication (step 411*b*-11). As may again be appreciated, the trust controller 24 determines whether the authentication verifies based on the result of the application (step 411*b*-13).

Turning once again to FIG. 4, if the trust controller 24 determines that the authentication does indeed verify, then the trust controller 24 may conclude that the data request originates from the trusted element that owns the sector 26 of such data request. The trust controller 24 therefore honors the request without further ado, and passes the request to the access controller 22 for further request processing as at step 405.

However, if the trust controller 24 determines that the authentication does not verify, then the trust controller 24 may conclude that the data request originates from a source other than the trusted element that owns the sector 26 of such data request. The trust controller therefore does not honor the request as at step 409, and the process ends. Once again, the trust controller 24 may return to the requesting element an appropriate message to the effect that the request is not honored.

Note that in the case where a trusted element is deleting data from a sector 24 of the trusted data store 18 and such sector 24 is to be released from ownership, the trust controller may perform the steps of FIG. 4 and also so releases the sector 26 at issue for the requesting trusted element by placing a release identifier in the corresponding entry of the sector ownership list 28, as at step 507 of FIG. 5, below.

Figure 5:
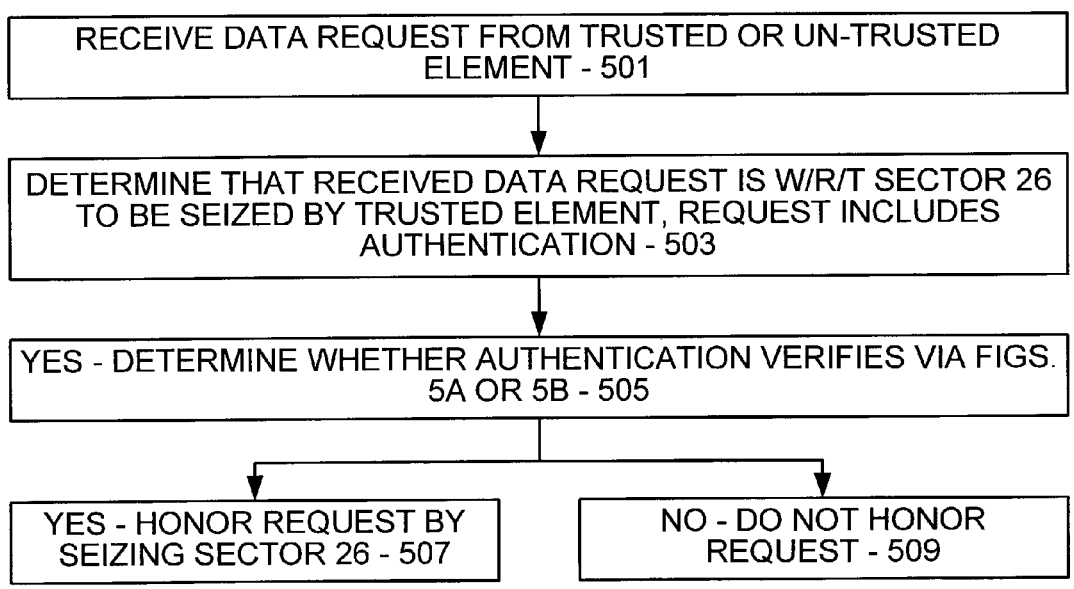
FIGS. 5, 5A, and 5B are flow diagrams showing steps performed in connection with the trusted data store of FIG. 3 in handling a data request that requires the trust controller to seize a sector of the trusted data store in accordance with one embodiment of the present invention.

Turning now to FIG. 5, a method employed by the trust controller 24 to respond to a data request in connection with a trusted data store 18 is shown, where the request requires the trust controller 24 to seize a sector 26 of the storage medium 20 of the trusted data store 18. Again, it is to be appreciated that the method is triggered when the trust controller 24 receives the data request from an element, either trusted or un-trusted (step 501).

After receiving the data request, and after determining that the sector 26 is not already seized as at steps 403 and 405, the trust controller 24 determines whether the received data request is with regard to a sector 26 that is to be seized by a trusted element such as the nexus 14 of a computing machine 10 or a sub-element thereof (step 503). Typically, a trusted element identifies itself by way of including with the data request an authentication, and accordingly, the trust controller 24 next determines whether the authentication verifies (step 505).

Figure 5A:
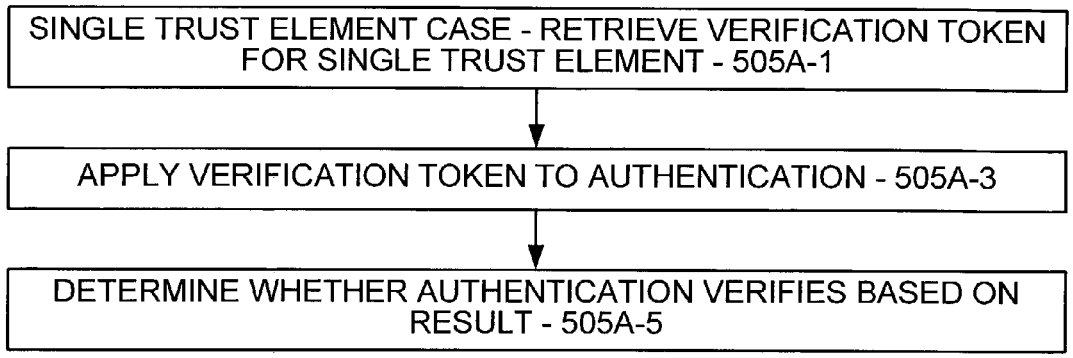

In particular, and turning now to FIG. 5A, if the trust controller 24 is only concerned with a single trusted element that accesses the data store 18, the trust controller retrieves the verification token for such single trusted element (step 505a-1), and applies the verification token to the authentication (step 505a-3). As may be appreciated, the trust controller 24 determines whether the authentication verifies based on the result of the application (step 505a-5).

Figure 5B:
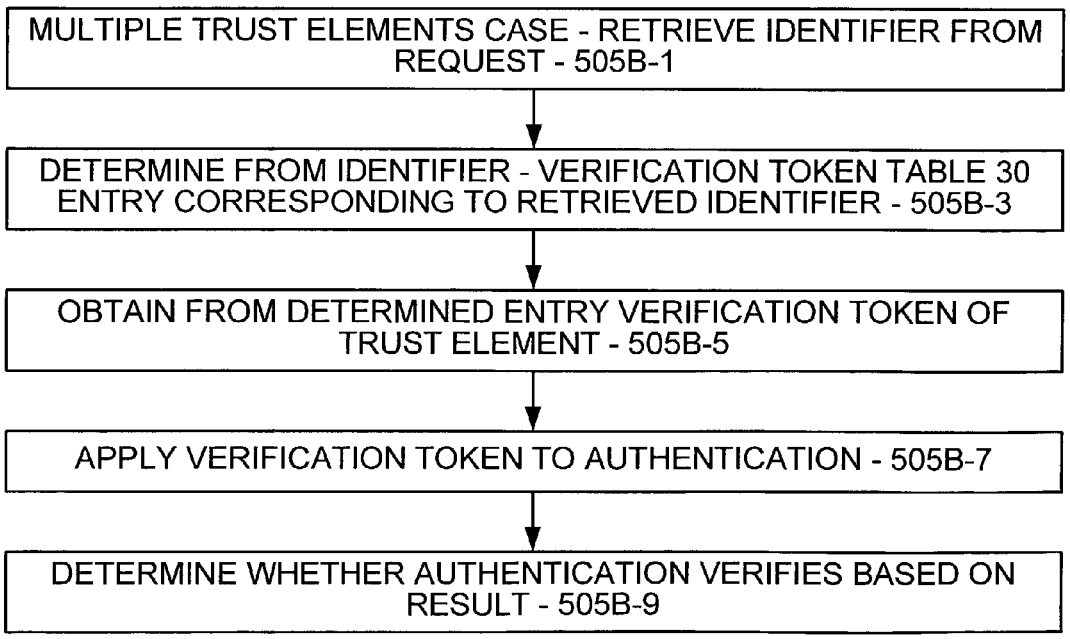

Turning now to FIG. 5B, if the trust controller 24 is concerned with multiple trusted elements that access the data store 18, the authentication may include therein an identifier identifying the trusted element, and the trust controller 24 retrieves the identifier from the request (step 505b-1), determines from the identifier-verification token table 30 the entry corresponding to the retrieved identifier (step 505b-3), and then obtains from the determined entry the verification token of the trusted element (step 505b-5). Once the verification token of the owning trusted element is obtained, and similar to the process shown in FIG. 5A, the trust controller 24 in FIG. 5B applies the verification token to the authentication (step 505b-7). As may again be appreciated, the trust controller 24 determines whether the authentication verifies based on the result of the application (step 505b-9).

If the trust controller 24 determines that the authentication does in fact verify, then such trust controller 24 seizes the sector 26 at issue for the requesting trusted element by placing the identifier of the trusted element in the corresponding entry of the sector ownership list 28 (step 507). As may be appreciated, the seized sector 26 is likely to receive new data as part of the data request, and therefore the process continues by passing the request to the access controller 22 to in fact write the new data to the seized sector 26. If the trust controller 24 determines that the authentication does not verify, then such trust controller 24 does not honor the request (step 509), and the process ends. Of course, the trust controller 24 may return to the requesting element an appropriate message to the effect that the request is not honored.

As should now be appreciated, in the present invention, a trust controller 24 in a trusted data store 18 seizes a sector 26 of the storage medium 20 of such trusted data store 18 for a requesting trusted element of a computing machine 10, and allows only such requesting trusted element to alter such seized sector 26 after authenticating itself to the trust controller 24. Thus, no interfering entity can alter such seized sector 26 inasmuch as the interfering entity should not be able to successfully emulate an authentication from the trusted element that owns the seized sector 26.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful trust controller 24 for preventing an interfering entity from attacking stored trusted data in a trusted data store 18 by deleting or overwriting such data. In addition, the trust controller 24 prevents the data store 18 from honoring any command from an interfering entity with respect to stored trusted data therein. Moreover, the trust controller 24 prevents the data store 18 from honoring any command from any entity other than the trusted element that owns the stored trusted data therein.

It should be appreciated that changes could be made to the embodiments described above without departing from the inventive concepts thereof.

For example, rather than employing the list 28 and table 30, the trust controller 24 may simply be for use with a single trusted element and may treat all sectors 26 on the storage medium 20 before a certain point as being seized and all sectors 26 after the certain point as not being seized. Moreover, rather than being divided into sectors 26, the storage medium 20 may be divided into some other portion arrangement. Further, rather than using a sector ownership list 28 and an identifier-verification token table 30, the sector ownership list 28 may have in each entry therein the verification token corresponding to the identifier. Note, too, that it may be the case that multiple trusted elements on one or more machines 10 could potentially share a common authentication, ID and token, and thus share common ownership to sectors 26 seized by any of such multiple trusted elements. It should be understood, therefore, that this invention is not limited to the particular embodiments disclosed, but it is intended to cover modifications within the spirit and scope of the present invention as defined by the appended claims.

The invention claimed is:

1. A trusted data store for use with a trusted element of a trusted operating system on a computing machine, the trusted data store comprising:
   a storage medium for storing data in a pre-determined arrangement, the data including trusted data from the trusted element of the trusted operating system on the computing machine, and also including other data from other elements of a non-trusted operating system of the computing machine;
   an access controller by which data including the trusted data and the other data is written to the storage medium and by which data including the trusted data and the other data is read from the storage medium; and
   a trust controller interposed between the trusted element and the access controller, the trust controller for allowing only the trusted element to perform operations on the trusted data thereof on the storage medium and for prohibiting other elements of the non-trusted operating system from performing operations on the trusted data of the trusted element on the storage medium, the trust controller for receiving a command with respect to the trusted data of the trusted element from the computing machine and for forwarding the command to the access controller only if the command is from the trusted element and not from any other element, whereby the trust controller ensures that only the trusted element may access the trusted data thereof as stored at the storage medium, wherein the trust controller allows the trusted element to perform operations on the trusted data thereof on the storage medium if the trusted element authenticates itself to the trust controller, wherein the trust controller receives from the trusted element as authentication a digital signature, and wherein the trust controller authenticates the trusted element by verifying the received signature based on a verification token from the trusted element, the trusted data store for use with a plurality of trusted elements, wherein the storage medium is divided into a number of logical units, and the access controller receives and responds to commands on a logical unit by logical unit basis, wherein the trust controller for each trusted element seizes logical units of the storage medium on behalf of and for exclusive use by the trusted element and not for use by any other trusted element, and wherein the trusted data store includes an ownership list that specifies for each logical unit of the storage medium at most a single trusted element that has seized such logical unit.

2. The trusted data store of claim 1 comprising at least one of a local hard disk drive, a local server, a local memory card, a local RAM, a remote hard drive, a remote server, a remote memory card, and a remote RAM.

3. The trusted data store of claim 1 in combination with the computing machine, the computing machine comprising one of a personal computer, a server computer, a portable content playback device, a cellular telephone, a landline telephone, a personal digital assistant (PDA), a digital radio, and a digital transceiver.

4. The trusted data store of claim 1 for use with a trusted element of a trusted operating system on each of a plurality of computing machines, the storage medium for storing trusted data from the trusted element of each computing machine, the trust controller interposed between each trusted element and the access controller and with respect to any particular trusted element only allowing the particular trusted element to perform operations on the trusted data thereof on the storage medium and for prohibiting other elements from performing operations on the trusted data of the particular trusted element on the storage medium.

5. The trusted data store of claim 1 wherein the trust controller comprises one of hardware, software, and a combination thereof, and wherein the trust controller is one of separate from and incorporated with the access controller.

6. The trusted data store of claim 1 comprising a plurality of the storage mediums.

7. The storage medium of claim 1 wherein the ownership list includes each logical unit of the storage medium and an identifier of the seizing trusted element thereof, if any.

8. The trusted data store of claim 7 wherein the trusted data store includes an identifier-verification token table that specifies for each identifier employed in the ownership list the corresponding verification token that is to be employed to verify a command with regard to the trusted element corresponding to such identifier.

* * * * *